United States Patent
Coskun et al.

(10) Patent No.: US 9,083,730 B2
(45) Date of Patent: Jul. 14, 2015

(54) METHODS AND APPARATUS TO IDENTIFY AN INTERNET PROTOCOL ADDRESS BLACKLIST BOUNDARY

(71) Applicant: AT&T Intellectual Property I, L.P., Atlanta, GA (US)

(72) Inventors: Baris Coskun, Weehawken, NJ (US); Suhrid Balakrishnan, Scotch Plains, NJ (US); Suhas Mathur, Bayonne, NJ (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 31 days.

(21) Appl. No.: 14/099,600

(22) Filed: Dec. 6, 2013

(65) Prior Publication Data

US 2015/0163235 A1    Jun. 11, 2015

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC ............. *H04L 63/1408* (2013.01); *H04L 63/14* (2013.01)

(58) Field of Classification Search
CPC .......................... H04L 63/14; H04L 63/1408
USPC ...................................................... 726/22, 23
See application file for complete search history.

(56) References Cited

U.S. PATENT DOCUMENTS

| | | | |
|---|---|---|---|
| 7,607,021 B2 | 10/2009 | Rayes et al. | |
| 7,797,421 B1 | 9/2010 | Scofield et al. | |
| 7,849,502 B1 | 12/2010 | Bloch et al. | |
| 7,890,627 B1 | 2/2011 | Thomas | |

(Continued)

FOREIGN PATENT DOCUMENTS

| | | |
|---|---|---|
| CA | 2819832 A1 | 6/2012 |
| EP | 2517437 A1 | 10/2012 |

(Continued)

OTHER PUBLICATIONS

Stone et al., NPL "FIRE: Finding Rogue Networks", 2009, Applicant's submitted prior art.*

(Continued)

*Primary Examiner* — Peter Poltorak
*Assistant Examiner* — Quy Pham
(74) *Attorney, Agent, or Firm* — Hanley, Flight & Zimmerman, LLC

(57) ABSTRACT

Methods, apparatus, systems and articles of manufacture are disclosed to identify an Internet protocol address blacklist boundary. An example method includes identifying a netblock associated with a malicious Internet protocol address, the netblock having a lower boundary and an upper boundary, collecting netflow data associated with a plurality of Internet protocol addresses in the netblock, establishing a first window associated with a lower portion of Internet protocol addresses numerically lower than a candidate Internet protocol address, establishing a second window associated with an upper portion of Internet protocol addresses numerically higher than a candidate Internet protocol address, calculating a breakpoint score based on a comparison between a behavioral profile of the first window and a behavioral profile of the second window, and identifying a first sub-netblock when the breakpoint score exceeds a threshold value.

19 Claims, 8 Drawing Sheets

(56) References Cited

U.S. PATENT DOCUMENTS

| | | |
|---|---|---|
| 8,260,914 B1 | 9/2012 | Ranjan |
| 8,347,394 B1 | 1/2013 | Lee |
| 8,407,791 B2 | 3/2013 | Granstedt et al. |
| 8,533,821 B2 | 9/2013 | Crume |
| 8,549,639 B2 | 10/2013 | Newman et al. |
| 2007/0153689 A1* | 7/2007 | Strub et al. .................. 370/230 |
| 2008/0244742 A1 | 10/2008 | Neystadt et al. |
| 2008/0282338 A1 | 11/2008 | Beer |
| 2010/0211996 A1* | 8/2010 | McGeehan et al. .............. 726/4 |
| 2011/0302656 A1 | 12/2011 | El-Moussa |
| 2012/0124664 A1 | 5/2012 | Stein et al. |
| 2012/0198549 A1 | 8/2012 | Antonakakis et al. |
| 2012/0303808 A1 | 11/2012 | Xie |
| 2013/0086636 A1 | 4/2013 | Golovanov |

FOREIGN PATENT DOCUMENTS

| | | |
|---|---|---|
| WO | 2006094228 A2 | 9/2006 |
| WO | 2013030594 A1 | 3/2013 |

OTHER PUBLICATIONS

Moura et al., NPL "Internet Bad Neighborhoods Aggregation", 2012, Applicant's submitted prior art.*

Mathur et al., NPL "Detecting Hidden Enemy Lines in IP Address Space", Sep. 2013, http://www.winlab.rutgers.edu/~suhas/nspw03-mathur.pdf.*

Rhiannon Weaver and M. Patrick Collins, "Fishing for Phishes: Applying Capture-Recapture Methods to Estimate Phishing Populations," Oct. 4-5, 2007, 12 pages.

Brett Stone-Gross, Christopher Kruegel, Kevin Almeroth, Andreas Moser and Engin Kirda, "FIRE: Finding Rouge nEtworks," 2009, 10 pages.

Giovane C. M. Moura, Ramin Sadre, Anna Sperotto and Aiko Pras, "Internet Bad Neighborhoods Aggregation," 2012, 8 pages.

Qian Tang, Leigh Linden, John S Quarterman and Andrew B Whinston, "Improving Internet Security Through Social Information and Social Comparison: A Field Quasi-Experiment," 2013, 43 pages.

* cited by examiner

METHODS AND APPARATUS TO IDENTIFY AN INTERNET PROTOCOL ADDRESS BLACKLIST BOUNDARY

FIELD OF THE DISCLOSURE

This disclosure relates generally to network security, and, more particularly, to methods and apparatus to identify an Internet protocol address blacklist boundary.

BACKGROUND

In recent years, network security efforts have employed firewalls, Network Address Translation (NAT) devices and/or blacklists to block incoming network connections. When a particular Internet protocol (IP) address is discovered to be malicious, then the firewalls, NAT devices and/or blacklists can prevent further propagation of information to/from a network to be protected from communications associated with the IP address.

DETAILED DESCRIPTION

Example methods, apparatus, and articles of manufacture (e.g., storage media) disclosed herein involve identifying boundaries of blocks of Internet protocol (IP) addresses. Examples disclosed herein involve identifying a netblock associated with a malicious Internet protocol address, the netblock having a lower boundary and an upper boundary, collecting netflow data associated with a plurality of Internet protocol addresses in the netblock, establishing a first window associated with a lower portion of Internet protocol addresses numerically lower than a candidate Internet protocol address, establishing a second window associated with an upper portion of Internet protocol addresses numerically higher than a candidate Internet protocol address, calculating a breakpoint score based on a comparison between a behavioral profile of the first window and a behavioral profile of the second window, and identifying a first sub-netblock when the breakpoint score exceeds a threshold value.

Figure 1:
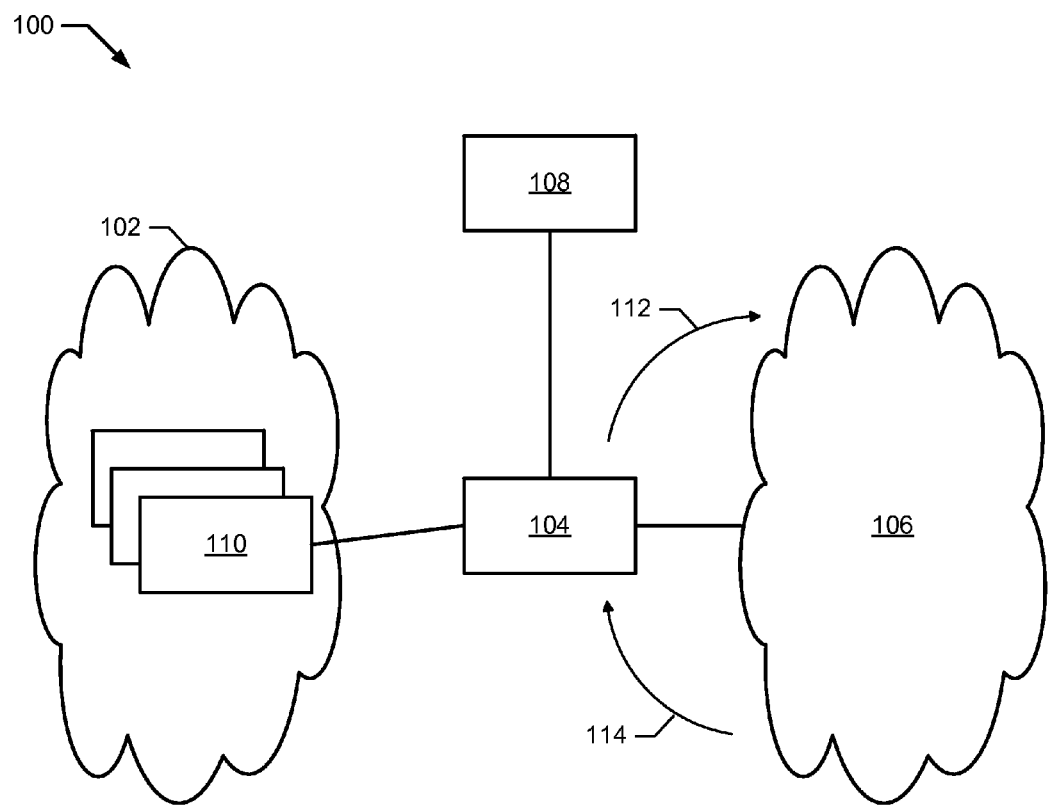
FIG. 1 is a schematic illustration of an example network environment with an example gateway to identify an Internet Protocol address blacklist boundary constructed in accordance with the teachings of this disclosure.

FIG. 1 includes an example network environment 100 that includes a network to be protected 102, a gateway 104 to facilitate communication between the network to be protected 102 and a second network 106 (e.g., the Internet), and a blacklist server 108 to identify one or more Internet protocol (IP) addresses that should be prevented from traversing to/from the network to be protected 102. The example network to be protected 102 may include any number of clients 110 that communicate with the second network 106 with outbound traffic 112 and/or inbound traffic 114.

While firewalls and Network Address Translation (NAT) devices help to provide defense for the network to be protected 102, such devices have little value when malicious network connections are initiated from within the network to be protected 102. For example, when one of the clients 110 makes a request for content from a malicious source on the network 106. Such internal security breaches may occur by malware or other sources tricking a user of the client 110 to click on a link containing a malicious IP address that is not yet identified by the example blacklist server 108.

Additionally, while the use of blacklists may prevent both incoming and outgoing network communications based on identified IP addresses deemed to be malicious, such blacklists require an exact match of known malicious IP addresses to be effective. However, even when one malicious IP address is identified, one or more neighboring IP addresses (e.g., IP addresses having a relatively small octet difference from the malicious IP address) may be under similar control of the malicious entity (e.g., a hacker). Generally speaking, malicious IP addresses tend to be clustered in certain portions of IP address space, which suggests that one or more IP addresses numerically adjacent to a known malicious IP address should also be blacklisted (e.g., blocked from incoming and/or outgoing communications).

Knowing that a set of hosts with IP addresses is in relative proximity to a known malicious IP address provides an opportunity to block a series of nearby IP addresses in an effort to improve network protection. At least one drawback in selecting an arbitrary range of IP addresses relatively near the known malicious IP address is that a certain number of innocuous and/or otherwise safe IP addresses may also be blacklisted, thereby overcompensating for the threat and blocking addresses that need not be blocked. In the event one or more of the innocuous blacklisted IP addresses is associated with a legitimate/safe entity, then future communications therewith will be forsaken due to the blocking.

At one extreme, all IP addresses within a netblock associated with the known malicious IP address may be deemed suspicious. As used herein, a "netblock" is a group of IP addresses that is grouped together based on one or more boundary indicators (breakpoints). In some examples, a netblock is the smallest contiguous set of IP addresses known (e.g., publically) to be assigned to a single organization. In other examples, a netblock is identified based on a controlling entity of a range of IP addresses, such as a business entity identified by a domain registration search (e.g., WHOIS), which may provide a starting IP address and an ending IP address associated with a name, phone number and/or mailing address. However, while a first entity may be a registered owner of the netblock, one or more sub-netblocks may reside therein. In the illustrated example of FIG. 2, a query to a domain register reveals a netblock 200 that includes a first boundary that resides at X.X.0.0 (element 202) and includes a second boundary that resides at X.X.0.16 (element 204). The registered owner of the netblock 200 may have sold usage rights for any number of sub-portions (sub-netblocks) of the example netblock to third parties. The illustrated example of FIG. 2 includes a first sub-netblock 206, a second sub-netblock 208 and a third sub-netblock 210 that have been allocated by the registered owner of the netblock 200. Example methods, apparatus, systems and/or articles of manufacture disclosed herein reveal breakpoints (boundaries) of a netblock (e.g., an example first breakpoint 212 and an example second breakpoint 214) that delineate the example boundaries between the example first sub-netblock 206, the example second sub-netblock 208 and the example third sub-netblock 210.

Sub-netblocks may be created by the netblock owner for use by other interested parties that require a group of IP addresses, which may mean that the registered owner has no participation and/or management of the one or more sub-netblocks outside of its original lease agreement. Some of those interested parties that are allocated a sub-netblock may be associated with legitimate network activity, while other interested parties that are allocated other sub-netblock(s) may be associated with malicious network activity. In either case, if a registered owner of a netblock distributes one or more portions of that netblock (sub-netblock) to other parties, the boundaries/breakpoints of any corresponding sub-netblock are unpublished and/or otherwise unknown.

As such, in the event an extreme measure is taken to blacklist an entire netblock, which includes all underlying sub-netblocks, then the legitimate interested parties are negatively affected. For example, if a netblock is identified as IP address X.X.0.0/0 through X.X.0.0/16, then that netblock contains $2^{16}$ (65,536) IP addresses. Accordingly, in the event the malicious entity only has control of a sub-netblock containing eight (8) IP addresses, then 65,528 (i.e., 65,536-8) IP addresses are wasted in the effort to protect the network from the malicious eight (8) IP addresses.

Figure 3:
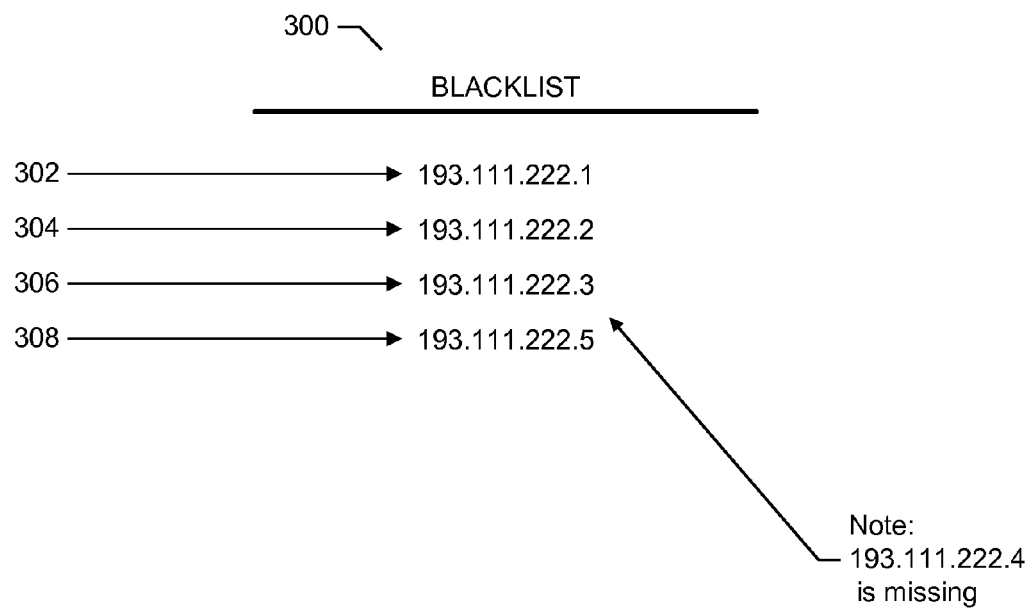
FIG. 3 is an example blacklist employed by the network environment of FIG. 1.

In an opposite extreme, a traditional blacklist is shown in FIG. 3. In the illustrated example of FIG. 3, a blacklist 300 includes a first IP address 302, a second IP address 304, a third IP address 306 and a fourth IP address 308. While all of the identified IP addresses are deemed to be malicious and, as a result, blocked from connecting to the network to be protected, the example blacklist 300 does not include IP address 193.111.222.4, which is likely under the same management as the other listed IP addresses. Example methods, apparatus, systems and/or articles of manufacture disclosed herein strike a balance between such selective blacklisting as shown in FIG. 3, and such overreaching blacklisting as described above (e.g., blacklisting $2^{16}$ IP addresses to protect the example network 102 from eight (8) malicious IP addresses).

Figure 4:
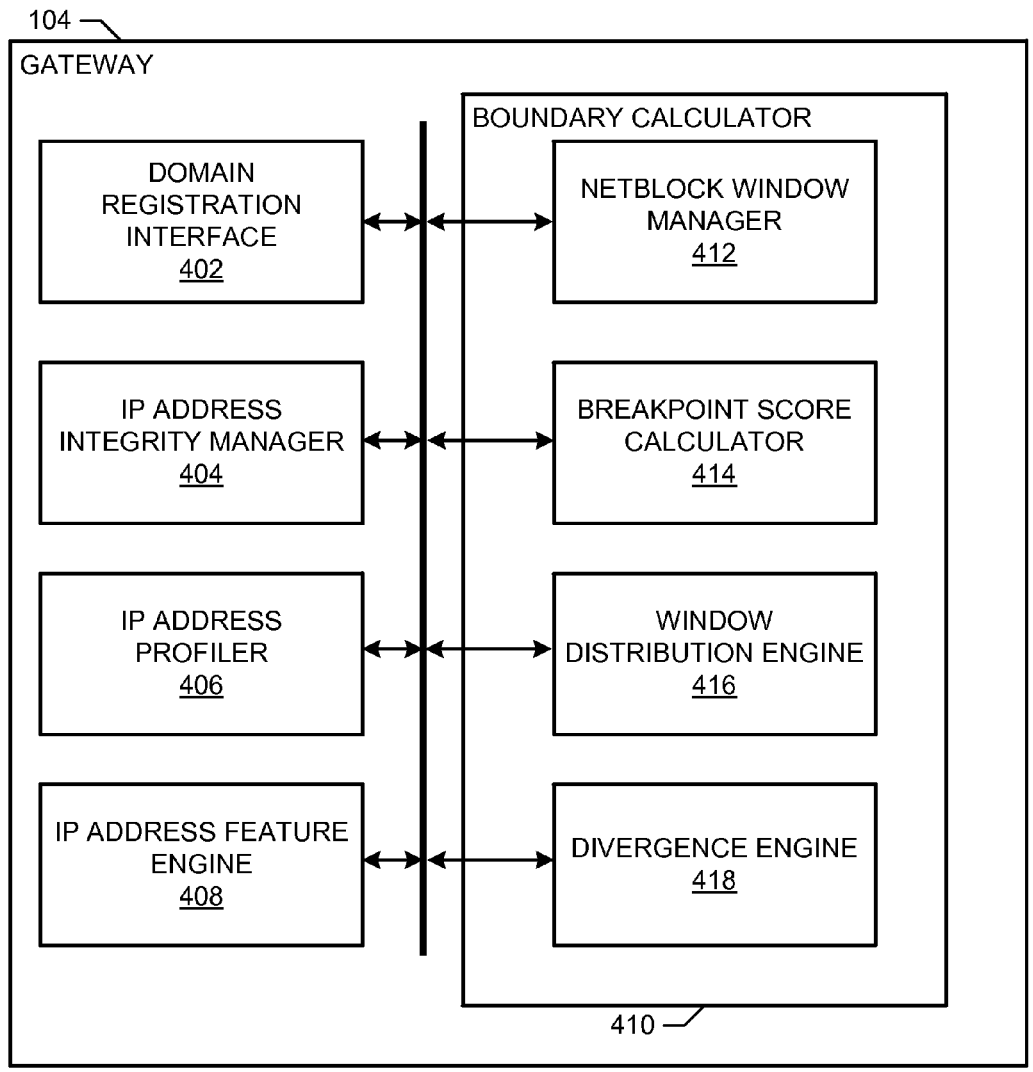
FIG. 4 is a block diagram of the example gateway of FIG. 1 constructed in accordance with the teachings of this disclosure.

FIG. 4 illustrates additional detail of the example gateway 104 of FIG. 1. In the illustrated example of FIG. 4, the gateway 104 includes a domain registration interface 402, an IP address integrity manager 404, an IP address profiler 406, an IP address feature engine 408 and a boundary calculator 410. The example boundary calculator 410 includes an example netblock window manager 412, an example breakpoint score calculator 414, an example window distribution engine 416, and an example divergence engine 418. In operation, the example IP address integrity manager 404 identifies a known malicious IP address in an effort to identify a profile associated with adjacent IP addresses, and in an effort to identify breakpoints of the adjacent IP addresses, as described in further detail below. The example malicious IP address may be identified by third party monitoring agents including, but not limited to, Spamhaus® and the Spamhaus Project that tracks spam operations on the Internet.

The example domain registration interface 402 queries one or more domain registries to identify a registered netblock that contains the malicious IP address. As described above, querying the domain registry identifies at least a range of IP addresses allocated to a single entity having a corresponding name, business address and/or other entity information. However, the range of IP addresses that make up the netblock are not necessarily under the control of the name to which the netblock is registered because some sub-blocks of the netblock may be further sold or leased to any number of other parties. In other examples, sub-assignments (sub-netblocks) may be owned by a single/common entity, but may have been divided to focus on particular functions. For instance, a corporation may sub-divide a portion of IP addresses to an accounting department and a separate portion of IP addresses to an engineering department. In the event one IP address is known to be malicious within one such portion, then other IP addresses within that portion (sub-netblock) are likely to share security/vulnerability properties. Once the netblock breakpoints have been identified (e.g., the IP address boundaries of the netblock containing the malicious IP address), the example IP address profiler 406 collects netflow data for any or all IP addresses within the netblock. Netflow data may be captured by the example IP address profiler 406 by communicative access to, for example, a Tier-1 Internet service provider (ISP) for a period of time. Netflow data may include, but is not limited to, source IP addresses, destination IP addresses, a number of bytes between source/destination IP addresses and protocols used.

Captured netflow data is analyzed by the example IP address feature engine 408 to identify features for each IP address within the monitored netblock. Any number of features for each IP address may be extracted from the captured netflow data including, but not limited to features related to counts (e.g., number of bytes associated with the monitored IP address, number of packets, etc.), features related to IP addresses that the monitored IP addresses communicate with (e.g., an arithmetic mean of the IP addresses communicated with, an entropy of a distribution of IP addresses, an indication (e.g., a quantity) of the number of unique IP addresses communicated with versus repeat IP addresses communicated with), and features related to the ports used by the monitored IP addresses (e.g., most frequently used port(s), entropy values of port number/destination, number of unique ports used, etc.). In some examples, extracted features of monitored IP addresses are aggregated on a daily basis and further distinguished/segregated based on protocol type (e.g., transmission control protocol (TCP), user datagram protocol (UDP), Internet control message protocol (ICMP), etc.). Additional features extracted from the monitored IP addresses include whether protocol flows are completed (e.g., an indication of communication), or whether protocol flows are incomplete (e.g., an indication of scanning). Features may also include direction information, such as whether a flow is outgoing or incoming.

Extracted features may be averaged across a time period of interest (e.g., average feature values per day), which may further be aggregated for another time period (e.g., average feature values per day aggregated over a month time period). From these extracted features, dominant values may be identified, such as a dominant/most frequent port used across an entire month. The example IP address profiler 406 builds behavioral profiles for each IP address of interest within the netblock. Using the extracted features and profile information for each IP address, the example boundary calculator 410 calculates boundaries within the netblock. As described in further detail below, after boundaries within the netblock are identified, sub-netblocks are exposed that themselves exhibit certain behaviors that may be profiled. After generating a profile for each sub-netblock of interest, such as a profile of a sub-netblock having at least one malicious IP address therein, other sub-netblocks may be profiled to identify similarities therebetween. Such similarities may reveal other sub-netblocks that should be candidates for blacklisting despite the fact that no single IP address therein has a confirmed malicious IP address.

To calculate boundaries within the netblock of interest, the example netblock window manager 412 establishes a window size to analyze a number of IP addresses above the IP address of interest, and a number of IP addresses below the IP address of interest. Generally speaking, each IP address of interest is analyzed to compute a corresponding breakout score so that relatively abrupt differences between breakout scores indicate a candidate breakpoint. In other words, if a first IP address has a breakout score substantially (e.g., over a threshold value) different than an adjacent IP address, then a sub-netblock boundary may be evident. As described in further detail below, for each potential boundary (sometimes referred to herein as a "breakpoint") a breakpoint score ($\sigma(i)$) is calculated and represents a degree of difference between IP addresses on either size of the window. Confirmed breakpoints may be identified based on a threshold breakpoint score because a behavioral profile of IP addresses above the candidate breakpoint IP address are different than a behavioral profile of IP addresses below the candidate IP address. The example sub-netblock also allows one or more contiguous regions of IP addresses to be identified with the breakpoint IP address indicative of a delimited boundary. In addition to example boundary detection techniques disclosed herein, example methods, apparatus, systems and/or articles of manufacture disclosed herein are not limited thereto. In some examples, a K-Means algorithm may be employed to detect boundaries.

Breakpoint score calculation proceeds by the example breakpoint score calculator 414 associating the features for the $i^{th}$ IP address in a netblock to the variable $x^i$, in which the superscript i ranges over a quantity of M IP addresses in a netblock of interest. The example IP address feature engine 408 associates corresponding categorical features to each IP address as the quantity N, and the breakpoint score calculator 414 generates a vector of IP address features in a manner consistent with example Equation (1).

$$x^i = x^i_{j=1,\ldots,N} \qquad (1)$$

In the illustrated example of Equation (1), the variable N reflects a number of features extracted from each IP address, and each variable is a value taken on by a categorical variable with fifty-one (51) possible values based on an example adaptive quantization scheme. While any other type of approach may be employed, the example quantization scheme disclosed herein is employed in view of problems/challenges related to using features directly when such feature values may span over a relatively large or varying range. For example, flow counts could be unobserved for some IP addresses being monitored, while other IP addresses may exhibit flow counts in the millions. Another reason the quantization scheme is employed is in view of problems/challenges related to heterogeneity, in which the collected data is a mix of real-valued and categorical features. Examples of real-valued features are mean counts per day, flow distribution entropies, etc. Examples of categorical variables are the dominant ports for one or more types of flows (e.g., TCP/UDP, incoming/outgoing, remote/local, etc.). Another reason the quantization scheme is employed is in view of problems/challenges related to missing data. When values are missed and/or otherwise unobserved, particularly when some IP addresses do not have any flows of a particular type (e.g., incoming UDP flows) for the entire duration of data collection.

To deal with these problems/challenges, the collected data is transformed into a categorical dataset using an adaptive quantization scheme. The example quantization scheme is based on sorting values into 50 equally spaced bins have percentiles starting at 2 and ending at 100 (i.e., 2, 4, . . . , 98, 100). The bins are to apply an equal number of weighted points, and dithering is employed to randomize quantization error (e.g., by adding a relatively small amount of random noise to feature values). This transformation to purely categorical data addresses the large-range issue and the issue related to having the mixture of categorical, real values data, and missing information. In particular, the absence of information in some IP address features is handled by a $51^{st}$ bin, which is not balanced/weighted in a manner similar to the other fifty bins.

The example breakpoint score calculator 414 assigns the variable $x^i_j$ as a sparse vector representation having K components, where K=51, and every observation $x^i$ may be viewed as a (sparse) matrix of size N×K, rather than a vector of size N. As described above, the analysis of an IP address of interest occurs on either side (i.e., IP addresses having a numeric value lower than the IP address of interest, and IP addresses having a numeric value higher than the IP address of interest) of a window of size w. An example ordered set of IP addresses in the window of size w to the left (i.e., lower values) of the IP address of interest (i) is arranged by the netblock window manager 412 in a manner consistent with example Equation (2).

$$\overleftarrow{wi} = \{i-|w|, \ldots, i\} \qquad (2)$$

Similarly, an example ordered set of IP addresses in the window of size w to the right (i.e., higher values) of the IP address of interest (i) is arranged by the netblock window manager 412 in a manner consistent with example Equation (3).

$$\overrightarrow{wi} = \{i+1, \ldots, i+|w|\} \qquad (3)$$

For any IP address of interest i and categorical feature j, the set of observations in an w-window (Omega window) to the left (i.e., lower) has a summary count statistics vector calculated by the example IP address feature engine 408 in a manner consistent with example Equations (4) and (5).

$$c_j^{\overleftarrow{wi}} = [c_{j1}, \ldots, c_{jK}] \qquad (4)$$

$$c_{jK} = \Sigma_{\{z \in \overleftarrow{wi}\}} x_j^z \qquad (5)$$

In the illustrated example of Equation (4), $c_j^{\overleftarrow{wi}}$ is a vector of counts of the number of occurrences of the one or more categories for feature j in the left window observation set. In a similar manner, $c_j^{\overrightarrow{wi}}$ is the right window (i.e., IP address values greater than i) statistics vector.

The example window distribution engine 416 calculates a Multinomial window distribution for the left and right sides of the window using the K-dimensional vector described above in a manner consistent with example Equation (6).

$$p_{jk}^{\overleftarrow{wi}} = \frac{c_{jk} + \varepsilon}{(|w| + K * \varepsilon)} \qquad (6)$$

In the illustrated example of Equation (6), a relatively small Laplace fraction $\varepsilon$ is assumed. Similarly, an analogous expression for $p_{jk}^{\overrightarrow{wi}}$ results from using $c_j^{\overrightarrow{wi}}$. Using the final K-dimensional Multinomial window distributions for $\overleftarrow{wi}$ and $\overrightarrow{wi}$, the example divergence engine 418 computes a divergence as a symmetric measure of similarity between two probability distributions P and Q defined in a manner consistent with example Equation (7).

$$JS(P\|Q)=H(X)-H(X|Z) \quad (7)$$

In the illustrated example of Equation (7), the divergence is calculated based on the Jensen-Shannon divergence technique, but example methods, apparatus, systems and/or articles of manufacture disclosed herein are not limited thereto. Additionally, H refers to the entropy, X refers to a random variable coming from a mixture distribution of 0.5* (P+Q), and Z is a binary indicator variable such that Z=1 when X is from P and Z=0 when X is from Q.

As such, for any breakpoint IP address i, for each feature j, the example divergence engine 418 computes the divergence in a manner consistent with example Equation (8).

$$s_{ij}=JS(p_j \overleftarrow{wi} \| p_j^{\vec{wi}}) \quad (8)$$

The breakpoint score is based on the divergence calculation of example Equation (8), and is calculated by the example breakpoint score calculator 414 in a manner consistent with example Equation (9).

$$\sigma_i = \Sigma_{j=1}^N s_{ij} \quad (9)$$

Figure 2:
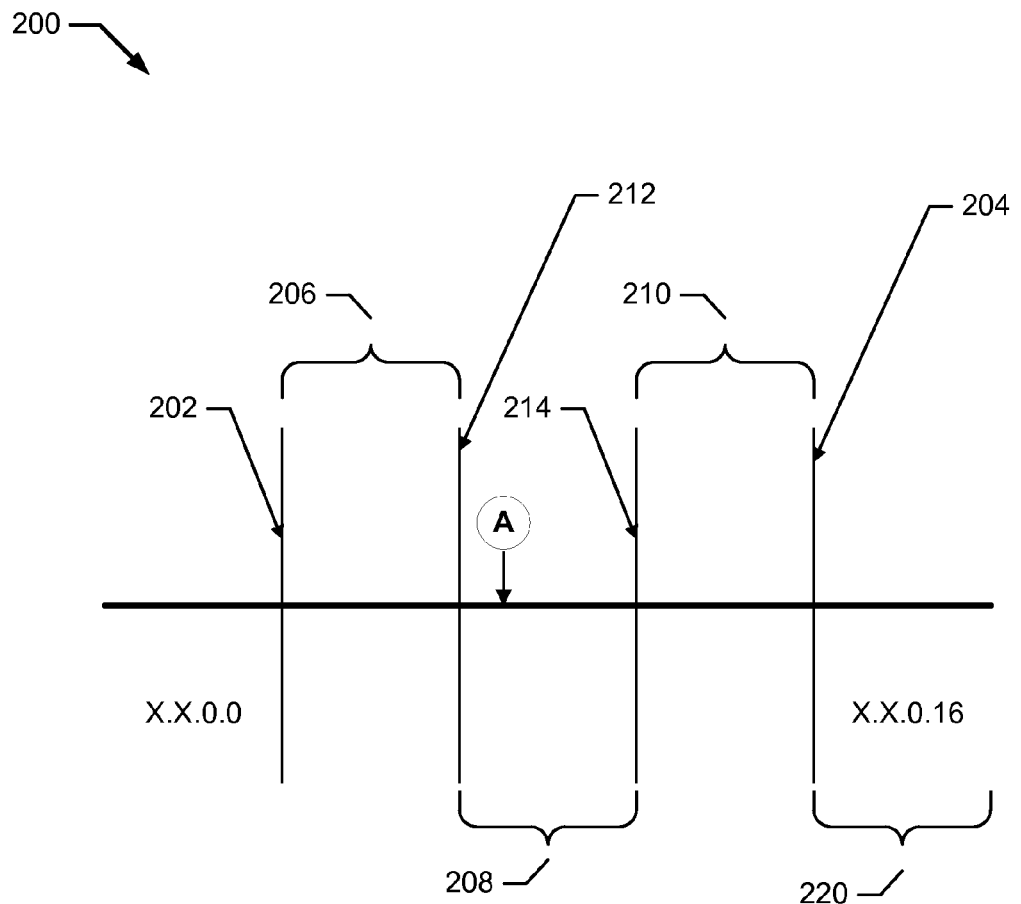
FIG. 2 is a diagram showing an example netblock and corresponding netblock boundaries identified by the example gateway of FIG. 1.

As described above, each IP address of interest within the netblock will be analyzed to calculate a corresponding breakpoint score, in which a relatively higher value is an indication of a greater difference between IP addresses on the left and right (lower IP address values and higher IP address values) of the IP address under evaluation. A list of all breakpoint scores for all IP addresses within the netblock under analysis may be cultivated and culled to retain only those breakpoint scores that exceed a threshold value. Returning briefly to FIG. 2, breakpoint scores that exceed the threshold value of interest are shown as the first breakpoint 212 and the second breakpoint 214. With knowledge of these example breakpoints, future decisions regarding which IP addresses to include in a blacklist may occur with greater accuracy and less waste of other IP addresses that may be safe. For example, in response to identifying that the IP address associated with "A" on FIG. 2 is malicious, only those adjacent IP addresses in between the first breakpoint 212 and the second breakpoint 214 need to be blacklisted by the example gateway 104. Accordingly, the example first sub-netblock 206 and the example third sub-netblock 210 may be allowed to communicate with the network to be protected 102.

Based on the knowledge that the breakpoints identify boundaries associated with a malicious entity responsible for the malicious IP address (e.g., the malicious IP address "A" of FIG. 2), the example IP address profiler 406 characterizes the sub-netblock to generate a profile (e.g., a signature indicative of the malicious entity). In some examples, the malicious entity may have two or more sub-netblocks that are employed for malicious purposes, but such sub-netblocks may not be adjacent to each other. For example, while the example second sub-netblock 208 of FIG. 2 was identified as associated with the malicious entity responsible for the malicious IP address "A," that malicious entity may also be responsible for an example fourth sub-netblock 220, which is not immediately adjacent to the example second sub-netblock 208. In the event the example IP address profiler 406 identifies another sub-netblock having a similar signature, then IP addresses associated therewith may be added to the blacklist by the example blacklist server 108.

While an example manner of implementing the gateway 104 of FIG. 1 is illustrated in FIG. 4, one or more of the elements, processes and/or devices illustrated in FIGS. 1 and/or 4 may be combined, divided, re-arranged, omitted, eliminated and/or implemented in any other way. Further, the example blacklist server 108, the example domain registration interface 402, the example IP address integrity manager 404, the example IP address profiler 406, the example IP address feature engine 408, the example boundary calculator 410, the example netblock window manager 412, the example breakpoint score calculator 414, the example window distribution engine 416, the example divergence engine 418 and/or, more generally, the example gateway 104 of FIGS. 1 and/or 4 may be implemented by hardware, software, firmware and/or any combination of hardware, software and/or firmware. Thus, for example, any of the example blacklist server 108, the example domain registration interface 402, the example IP address integrity manager 404, the example IP address profiler 406, the example IP address feature engine 408, the example boundary calculator 410, the example netblock window manager 412, the example breakpoint score calculator 414, the example window distribution engine 416, the example divergence engine 418 and/or, more generally, the example gateway 104 of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example blacklist server 108, the example domain registration interface 402, the example IP address integrity manager 404, the example IP address profiler 406, the example IP address feature engine 408, the example boundary calculator 410, the example netblock window manager 412, the example breakpoint score calculator 414, the example window distribution engine 416, the example divergence engine 418 and/or, more generally, the example gateway 104 of FIGS. 1 and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example gateway of FIGS. 1 and/or 4 may include one or more elements, processes and/or devices in addition to, or instead of, those illustrated in FIG. 4, and/or may include more than one of any or all of the illustrated elements, processes and devices.

Figure 5:
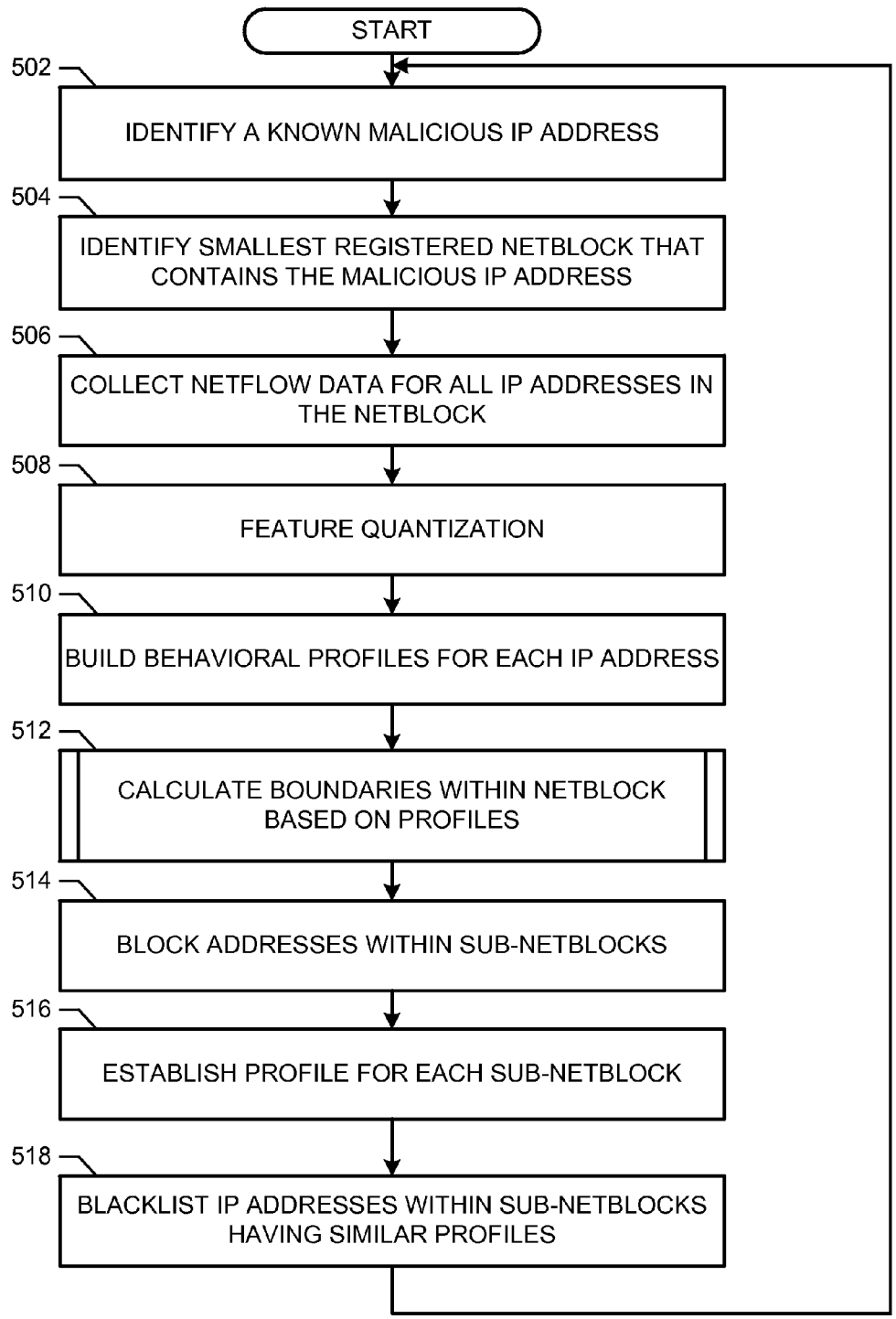
FIGS. 5-7 are flowcharts representative of example machine readable instructions that may be executed to implement the gateway of FIGS. 1 and 4 to identify an Internet protocol address blacklist boundary.
Figure 6:
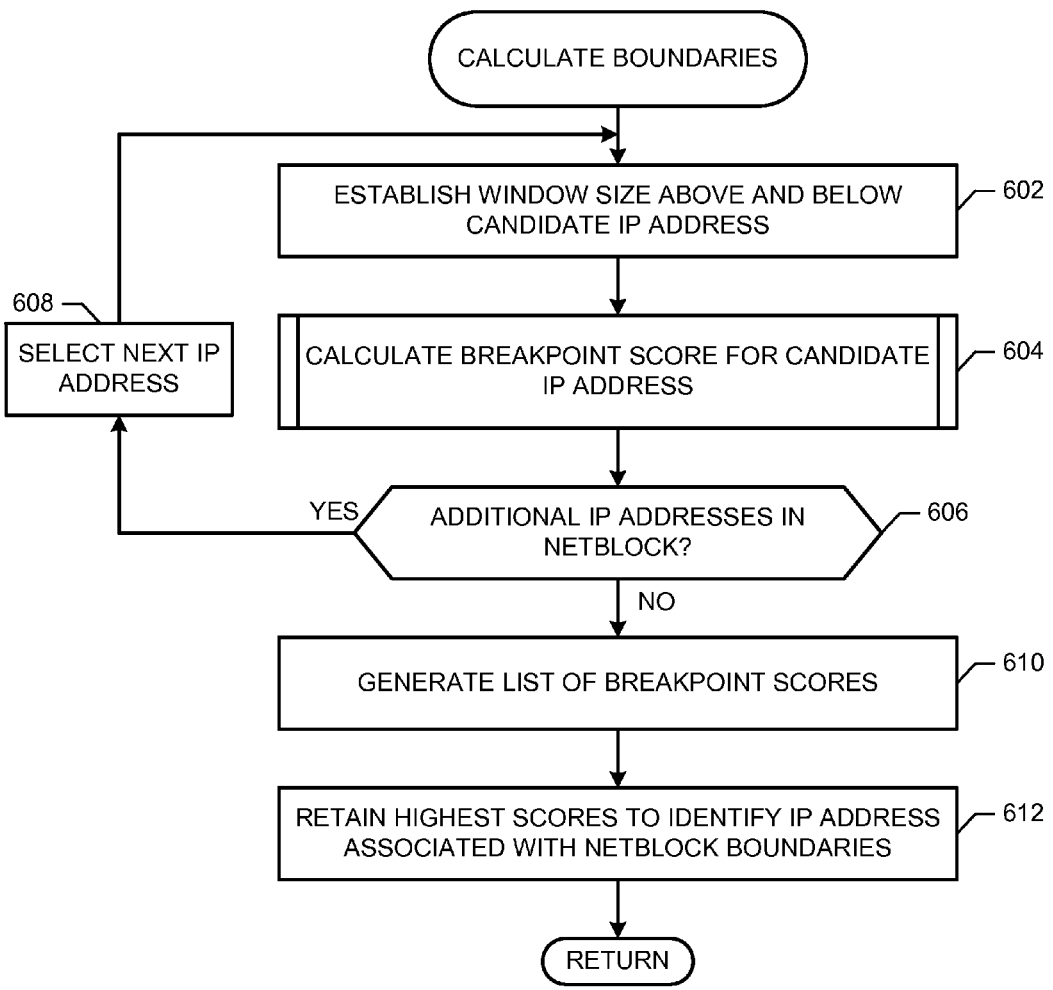
Figure 7:
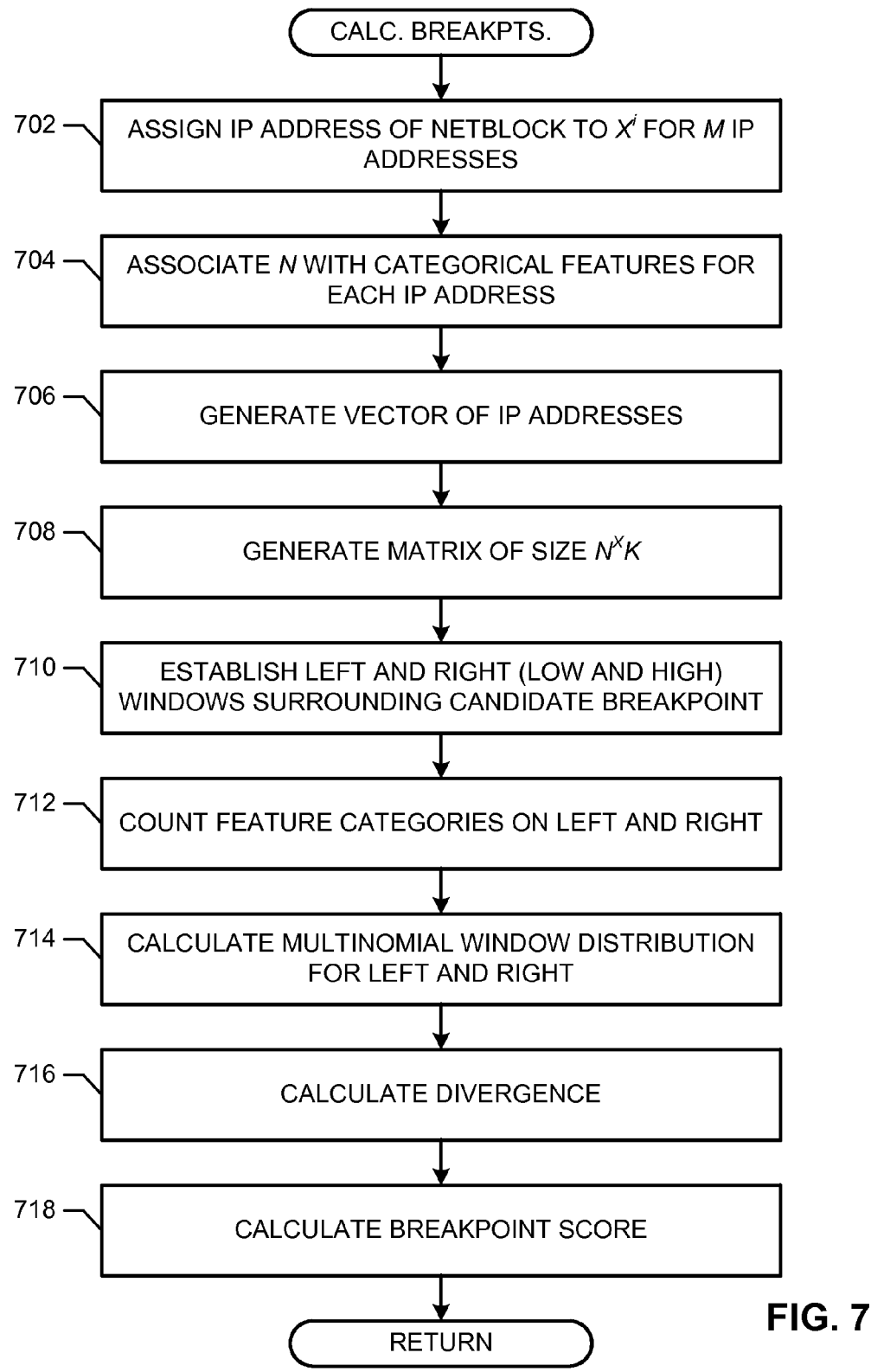

Flowcharts representative of example machine readable instructions for implementing the gateway 104 of FIGS. 1 and/or 4 are shown in FIGS. 5-7. In these examples, the machine readable instructions comprise a program for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program(s) are described with reference to the flowchart illustrated in FIGS. 5-7, many other methods of implementing the example gateway 104 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 500 of FIG. 5 begins at block 502 where the example IP address integrity manager 404 identifies a known malicious IP address. As described above, one or more services may be queried and/or otherwise consulted regarding the malicious nature of an IP address of interest, while in other examples a manager of the example network to be protected 102 may identify one or more IP addresses believed to be malicious. Each IP address is registered through the Internet Assigned Numbers Authority (IANA) or one of its five regional Internet registry (RIR) systems throughout the world. The example domain registration interface 402 initiates a query to one or more registration entities to identify a smallest registered netblock that contains the malicious IP address of interest (block 504).

For example, throughout a duration of interest (e.g., day(s), week(s), month(s), etc.), the example IP address profiler 406 collects netflow data for all IP addresses within the identified netblock (block 506). Netflow data collection by the example IP address profiler 406 may occur via communicative access to a Tier-1 ISP and/or other node(s) accessible to the example gateway 104.

As described above, the netflow data collection may not always be complete, or some IP addresses within the example netblock may exhibit relatively substantial disparity in feature behavior. As such, the example IP address feature engine 408 employs one or more feature quantization techniques to the collected netflow data to mitigate errors related to large/varying range, lack of heterogeneity, and/or missing data (block 508). One or more features associated with each IP address within the example netblock are used to build a behavioral profile for each IP address (block 510), and such aggregated features are employed to calculate and/or otherwise identify sub-boundaries (sub-netblocks) within the netblock (block 512).

FIG. 6 illustrates additional detail related to calculating boundaries within the netblock of interest (block 512). In the illustrated example of FIG. 6, the example netblock window manager 412 establishes a window size above and below the candidate IP address of interest within the netblock (block 602). Window size (w) may be selected based on design choice, empirical analysis and/or application of one or more statistical analysis (e.g., statistics related to variation of information theory). In some examples, the netblock window manager 412 establishes two separate window sizes on either side of the candidate IP address of interest. Generally speaking, separate windows (groupings of IP addresses) may exhibit behaviors that, when substantially different than the behaviors associated with an adjacent window, suggest the existence of a breakpoint (boundary of management between blocks of IP addresses). The example breakpoint score calculator 414 calculates the breakpoint score for the candidate IP address (block 604) as described above and in further detail below, and the example IP address profiler 406 determines whether there are additional IP addresses within the netblock that have not yet been analyzed (block 606). If there are more IP addresses within the netblock that need to be analyzed to calculate a corresponding breakpoint score (block 606), then the example IP address profiler 406 selects a next IP address of interest within the netblock (block 608) and control returns to block 602. On the other hand, once all of the IP addresses within the netblock of interest have been analyzed to calculate corresponding breakpoint score values (block 606), the example breakpoint score calculator 414 generates a list of the breakpoint scores (block 610) and retains only those scores and corresponding IP addresses that exceed a threshold value (block 612). As discussed above, those breakpoint scores that are relatively higher and/or exceed the threshold value are indicative of boundaries within the netblock.

FIG. 7 illustrates additional detail associated with calculating the breakpoint score for each IP address within the netblock of interest (block 604). In the illustrated example of FIG. 7, the example breakpoint score calculator 414 assigns the IP address of interest to a sparse vector for the netblock having a value of M IP addresses (block 702). Based on the features detected from the netflow observations, the example IP address feature engine 408 associates the IP address of interest with a value of N categorical features (block 704), and the example breakpoint score calculator 414 generates a vector of IP addresses, as described above in view of example Equation (1) (block 706). The example breakpoint score calculator 414 generates a matrix of size N×K (i.e., number of detected categorical features for the IP address of interest by the possible values for each component) (block 708).

As described above, breakpoint score values are a function of netflow features on either side of an IP address of interest, and the example netblock window manager 412 establishes a left and right window range value (e.g., a number of IP addresses) surrounding the IP address of interest (block 710). Features of the IP addresses on either side of the IP address of interest are identified, counted and/or aggregated by the example IP address feature engine 408 (block 712), and the example window distribution engine 416 calculates a multinomial window distribution for either side of the IP address of interest (block 714) in a manner consistent with example Equation (6) described above. Using the final K-dimensional Multinomial window distributions for $\overleftarrow{wi}$ and $\overrightarrow{wi}$, the example divergence engine 418 computes a divergence as a symmetric measure of similarity between two probability distributions P and Q defined in a manner consistent with example Equation (7) (block 716), and the example breakpoint score calculator 414 calculates a corresponding breakpoint score (block 718).

Returning to FIG. 5, addresses within the identified sub-netblock associated with the malicious IP address are blocked by the example gateway 104 (block 514). The example IP address profiler 406 establishes a profile (signature) of the sub-netblock associated with the malicious IP address (block 516) so that other sub-netblocks can be blacklisted (block 518) preemptively even in circumstances where a single malicious IP address is not yet detected for a particular sub-netblock.

Figure 8:
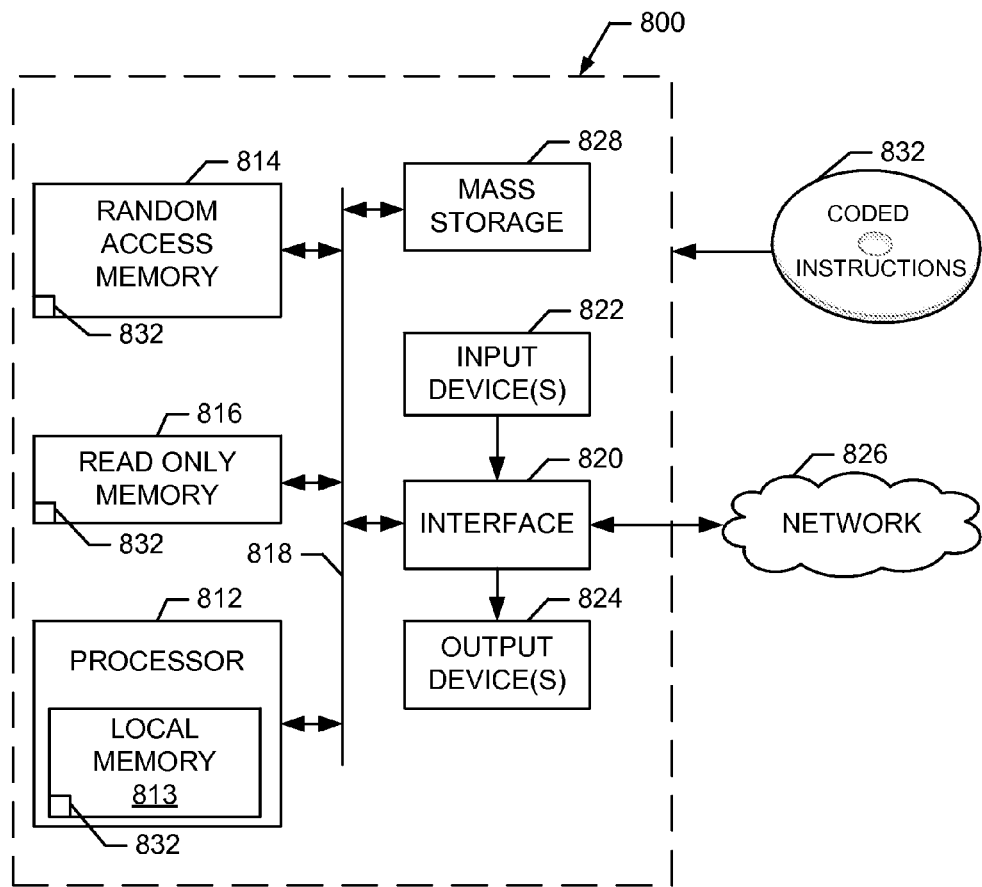
FIG. 8 is a block diagram of an example processor platform to execute the instructions of FIGS. 5-7 and/or to implement the example gateway of FIGS. 1 and 4.

FIG. 8 is a block diagram of an example processor platform 800 capable of executing the instructions of FIGS. 5-7 to implement the gateway 104 of FIGS. 1 and 4. The processor platform 800 can be, for example, a server, a personal computer, a mobile device (e.g., a cell phone, a smart phone, a tablet such as an iPad™), an Internet appliance, a gaming console, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 1012. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), and/or a touchscreen. The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture eliminate and/or otherwise reduce ambiguity associated with selecting IP addresses to add to a blacklist so that an overzealous range of blacklisted IP addresses does not forfeit the use of valid and/or innocuous IP addresses that are not associated with malicious behavior. Additionally, when a portion of a netblock (e.g., a sub-netblock) is identified as being associated with a malicious entity, a profile of that sub-netblock may be established and compared with one or more other sub-netblocks to identify candidate blacklisting opportunities to improve network safety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to identify a sub-netblock within a netblock, comprising:
   identifying, with a processor, a netblock associated with a malicious Internet protocol address, the netblock having a lower boundary and an upper boundary;
   collecting, with the processor, netflow data associated with a plurality of Internet protocol addresses in the netblock;
   establishing, with the processor, a first window associated with a lower portion of the plurality of Internet protocol addresses numerically lower than a candidate Internet protocol address;
   establishing, with the processor, a second window associated with an upper portion of the plurality of Internet protocol addresses numerically higher than the candidate Internet protocol address;
   calculating, with the processor, a divergence value between multinomial distribution values of the first window and the second window;
   calculating, with the processor, a breakpoint score based on the divergence value and a comparison between a behavioral profile of the first window and a behavioral profile of the second window; and
   identifying, with the processor, a first sub-netblock when the breakpoint score exceeds a threshold value.

2. The method as defined in claim 1, wherein the behavioral profile of the first and second windows is based on a quantity of netflow features identified in the collected netflow data.

3. The method as defined in claim 1, wherein the behavioral profile of the first and second windows is based on at least one of an arithmetic mean of Internet protocol addresses, an entropy of a distribution of Internet protocol addresses, a quantity of unique Internet protocol addresses, or a quantity of repeat Internet protocol addresses.

4. The method as defined in claim 1, further comprising adding Internet protocol addresses associated with the first sub-netblock to a blacklist.

5. The method as defined in claim 1, further comprising generating a profile of the first sub-netblock to compare to a second sub-netblock within the netblock.

6. The method as defined in claim 5, further comprising adding Internet protocol addresses associated with the second sub-netblock when a profile of the second sub-netblock matches the profile of the first sub-netblock.

7. An apparatus to identify a sub-netblock within a netblock, comprising:
- a memory to store machine readable instructions; and
- a processor to execute the instructions to perform operations comprising:
  - identifying a netblock associated with a malicious Internet protocol address, the netblock having a lower boundary and an upper boundary;
  - collecting netflow data associated with a plurality of Internet protocol addresses in the netblock;
  - establishing a first window associated with a lower portion of the plurality of Internet protocol addresses numerically lower than a candidate Internet protocol address;
  - establishing a second window associated with an upper portion of the plurality of Internet protocol addresses numerically higher than the candidate Internet protocol address;
  - calculating a divergence value between multinomial distribution values of the first window and the second window;
  - calculating a breakpoint score based on the divergence value and a comparison between a behavioral profile of the first window and a behavioral profile of the second window; and
  - identifying a first sub-netblock when the breakpoint score exceeds a threshold value.

8. The apparatus as defined in claim 7, wherein the operations further comprise the behavioral profile of the first and second windows based on a quantity of netflow features identified in the collected netflow data.

9. The apparatus as defined in claim 8, wherein the operations further comprise the quantity of netflow features including at least one of a number of bytes or a number of packets.

10. The apparatus as defined in claim 7, wherein the operations further comprise the behavioral profile of the first and second windows is based on at least one of an arithmetic mean of Internet protocol addresses, an entropy of a distribution of Internet protocol addresses, a quantity of unique Internet protocol addresses, or a quantity of repeat Internet protocol addresses.

11. The apparatus as defined in claim 7, wherein the operations further comprise adding Internet protocol addresses associated with the first sub-netblock to a blacklist.

12. The apparatus as defined in claim 7, wherein the operations further comprise generating a profile of the first sub-netblock to compare to a second sub-netblock within the netblock.

13. The apparatus as defined in claim 12, wherein the operations further comprise adding Internet protocol addresses associated with the second sub-netblock when a profile of the second sub-netblock matches the profile of the first sub-netblock.

14. A tangible machine readable storage device comprising instructions which, when executed, cause a machine to perform operations comprising:
- identifying a netblock associated with a malicious Internet protocol address, the netblock having a lower boundary and an upper boundary;
- collecting netflow data associated with a plurality of Internet protocol addresses in the netblock;
- establishing a first window associated with a lower portion of the plurality of Internet protocol addresses numerically lower than a candidate Internet protocol address;
- establishing a second window associated with an upper portion of the plurality of Internet protocol addresses numerically higher than the candidate Internet protocol address;
- calculating a divergence value between multinomial distribution values of the first window and the second window;
- calculating a breakpoint score based on the divergence value and a comparison between a behavioral profile of the first window and a behavioral profile of the second window; and
- identifying a first sub-netblock when the breakpoint score exceeds a threshold value.

15. The tangible machine readable storage device as defined in claim 14, wherein the operations further comprise the behavioral profile of the first and second windows is based on a quantity of netflow features identified in the collected netflow data.

16. The tangible machine readable storage device as defined in claim 14, wherein the operations further comprise the behavioral profile of the first and second windows is based on at least one of an arithmetic mean of Internet protocol addresses, an entropy of a distribution of Internet protocol addresses, a quantity of unique Internet protocol addresses, or a quantity of repeat Internet protocol addresses.

17. The tangible machine readable storage device as defined in claim 14, wherein the operations further comprise adding Internet protocol addresses associated with the first sub-netblock to a blacklist.

18. The tangible machine readable storage device as defined in claim 14, wherein the operations further comprise generating a profile of the first sub-netblock to compare to a second sub-netblock within the netblock.

19. The tangible machine readable storage device as defined in claim 18, wherein the operations further comprise adding Internet protocol addresses associated with the second sub-netblock when a profile of the second sub-netblock matches the profile of the first sub-netblock.

* * * * *